United States Patent [19]

Demou et al.

[11] 4,176,218
[45] Nov. 27, 1979

[54] HIGH RESILIENCE FLEXIBLE FOAMED POLYURETHANES, FOAMABLE MIXTURES AND PROCESS THEREFOR

[75] Inventors: John G. Demou, Lincoln Park; Edward R. Pray, Dearborn, both of Mich.

[73] Assignee: BASF Wyandotte Corporation, Wyandotte, Mich.

[21] Appl. No.: 842,621

[22] Filed: Oct. 17, 1977

[51] Int. Cl.$^2$ .................. C08G 18/24; C08G 18/22; C08G 18/63; C09K 3/00
[52] U.S. Cl. .................. 521/129; 252/182; 521/123; 521/125; 521/137; 521/904; 521/914
[58] Field of Search .................. 260/2.5 BE, 2.5 AW; 521/129, 174, 904, 137

[56] References Cited

U.S. PATENT DOCUMENTS

| | | | |
|---|---|---|---|
| 3,108,975 | 10/1963 | Lambert et al. | 260/2.5 |
| 3,112,281 | 11/1963 | Gromacki et al. | 260/2.5 |
| 3,336,242 | 8/1967 | Hampson et al. | 260/2.5 |
| 3,803,064 | 4/1974 | Fishbein | 260/2.5 AW |
| 3,823,201 | 7/1974 | Pizzini et al. | 260/861 |
| 3,943,075 | 3/1976 | Fishbein | 260/2.5 AW |
| 4,025,466 | 5/1977 | Jourquin | 260/2.5 AW |
| 4,026,837 | 5/1977 | Zimmerman | 260/2.5 BE |

FOREIGN PATENT DOCUMENTS 1389932 4/1975 United Kingdom ............ 260/2.5

Primary Examiner—H. S. Cockeram
Attorney, Agent, or Firm—Andrew E. Pierce; Joseph D. Michaels; Robert E. Dunn

[57] ABSTRACT

A flexible, highly resilient, cold-cure, closed-mold polyurethane foam can be produced by reacting a foamable mixture comprising an organic poly-isocyanate, water and a polyol. The foams of the invention are preferably prepared from a mixture of a hydroxyl-terminated graft copolymer and a hydroxyl-terminated polyoxyalkylene polyether in the presence of a co-catalyst mixture of at least one tertiary amine catalyst and at least one metal-containing basic catalyst. Said catalyst is selected from the group consisting of an alkali metal hydroxide, an alkaline earth metal hydroxide, an inorganic basic salt thereof derived from the reaction of said hydroxides with a weak inorganic acid, a metal organic basic salt catalyst derived from the reaction of at least one of said hydroxides with an organic acid and mixtures thereof. Useful metal organic catalysts are selected from the group consisting of the alkali and alkaline earth metal carboxylates, alkoxides and phenates. Useful inorganic basic metal salt catalysts are sodium bicarbonate and sodium carbonate.

15 Claims, 2 Drawing Figures

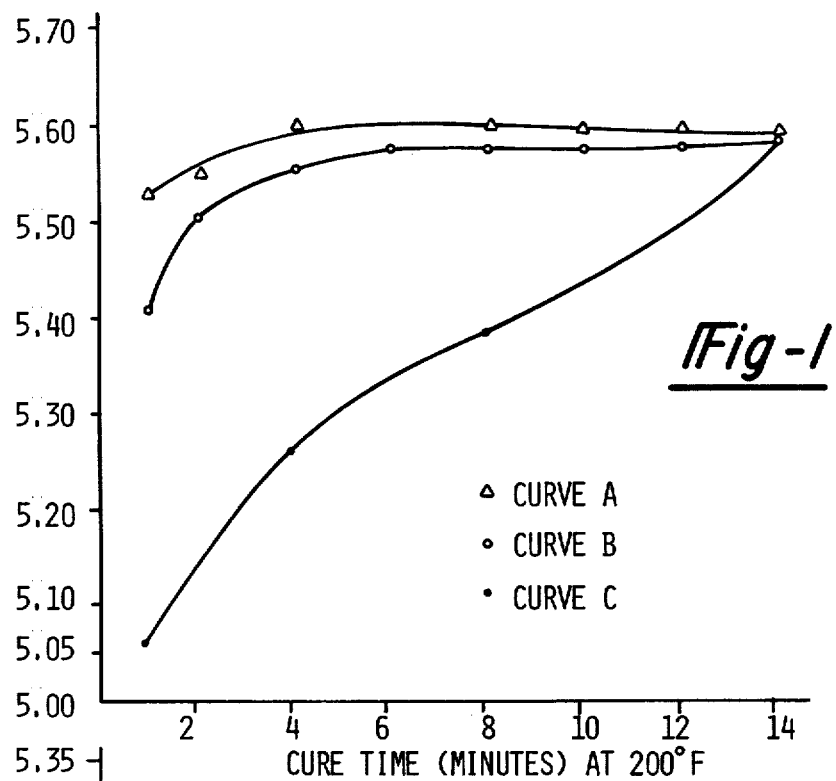
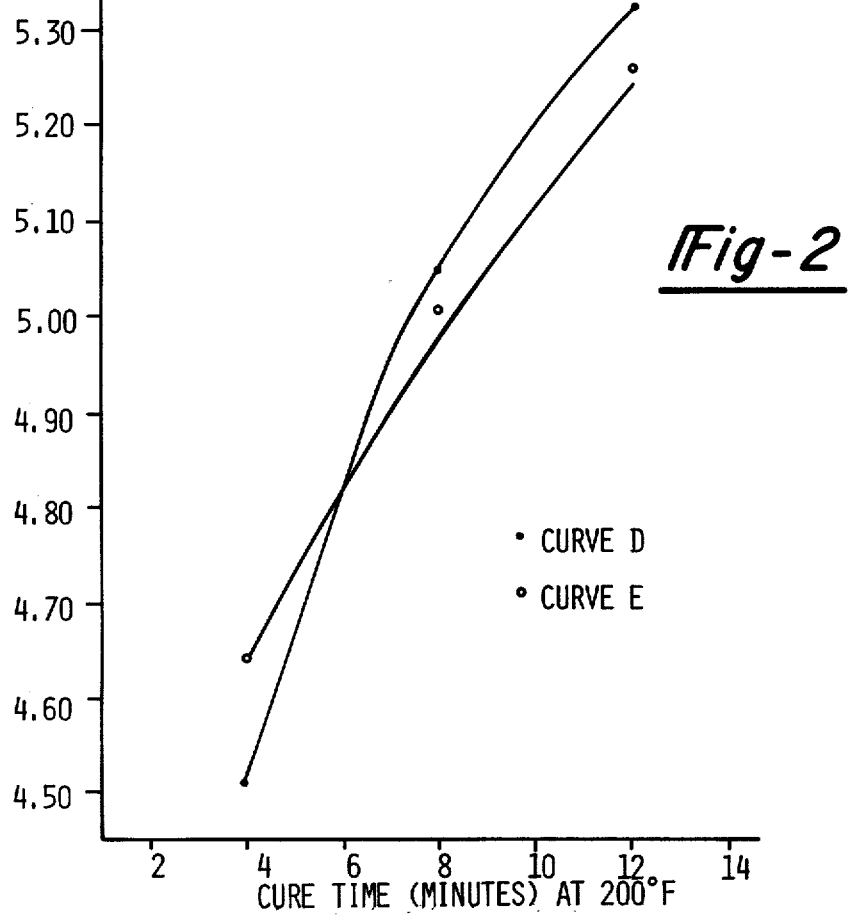

HIGH RESILIENCE FLEXIBLE FOAMED POLYURETHANES, FOAMABLE MIXTURES AND PROCESS THEREFOR

BACKGROUND OF THE INVENTION

1. Field of the Invention

The present invention relates to the manufacture of cold-cure, closed-mold, flexible, high resilience, foamed polymeric materials by reacting a polyol with an organic polyisocyanate.

2. Description of the Prior Art

Since about 1969, improved load-bearing polyurethane foams have appeared which are variously described as "cold-cure, closed-molded" or "high resiliency" foams. New techniques were developed to make small, molded flexible foam parts without the need for high temperature cure ovens used for producing conventional toluene diisocyanate-based so called "hot cure" foams. Typically, these "cold-cure" foams were produced using a combination of an ethylene oxide capped triol having a molecular weight of between 3000 and 5000 with crude polymethylene polyphenylisocyanate. Using these new techniques, foam is produced using molds heated to a temperature of 80° to 120° F. The foam can be stripped from the mold within 3 to 10 minutes subsequent to pouring, resulting in a considerable saving in processing time over the 15- to 20-minute mold time required using the prior hot molding conditions wherein the mold is heated to a temperature of 300° to 350° F. The high resilience, flexible foams produced by the cold-cure methods possess improved flex fatigue characteristics and inherently better flame retardance as well as improved load-bearing characteristics; the sag factor approaching that of a conventional rubber latex foam.

It is known to use an inorganic base compound such as sodium hydroxide or the salt of a strong inorganic base and a weak inorganic acid as illustrated by sodium carbonate as a catalyst for the reaction of a polyol with a diisocyanate to produce a flexible, resilient foam. Polyether polyols and polyesters are disclosed in U.S. Pat. No. 3,108,975 as useful in combination with a polyisocyanate and water in the formation, by a hot-cure process, of a flexible, resilient foam. Either a strong inorganic base or certain inorganic salts of a strong base and a weak acid are disclosed as catalysts for the reaction.

The use of sodium carbonate as a catalyst in the preparation of flexible polyurethane "cold cure" foams by the reaction of a polymeric polyol with tolylene diisocyanate is disclosed in U.S. Pat. No. 3,943,075. The foams produced are obtained by a "free-rise" process. Both tertiary organic bases and inorganic basic catalysts are disclosed as useful in producing a polyurethane foam from a diisocyanate and a polyol in U.S. Pat. No. 3,336,242. Besides metallic oxides and hydroxides, tertiary organic bases such as trimethylamine and ethyl-N-methyl morpholine are disclosed as useful for producing a polyurethane foam by the so called "one-shot" method. In Japanese Pat. No. 51,109,100, there is disclosed the use of an amine and/or an organic tin compound as a catalyst (for the production of polyurethane foam from the reaction of polyols and isocyanates) in combination with (1) a water-containing alkali metal compound, i.e., the sodium salt of carbonic acid, and (2) a special granular inorganic material which foams on heating. In U.S. Pat. No. 3,112,281 there is disclosed the preparation of a polyurethane foam by the reaction of a polyisocyanate with a polyhydric polyether having within the molecule a tertiary amine. It is noted that the polyether is supplied at a pH of about 8 to about 11 and can contain residual amounts of sodium hydroxide.

In no one of these references is there disclosed or suggested the reaction of an organic polyisocyanate and a polyol to produce a high resilience foam in the presence of a co-catalyst combination of a metal-containing basic catalyst with a tertiary amine catalyst to provide a foam having improved properties.

The preferred polyol, which is a graft copolymer dispersion of a vinyl monomer in a polyol having unsaturation is disclosed in U.S. Pat. No. 3,823,201. However, there is no indication therein that polyurethane foams having superior physical properties, as described herein, can be prepared therewith using the co-catalysts disclosed herein.

SUMMARY OF THE INVENTION

In accordance with the present invention, compositions are disclosed suitable for the preparation of flexible, high resilience, closed molded polyurethane foam. Such foams are preferably prepared by the catalyzed reaction as described herein, of a polyol such as a hydroxyl-terminated, ethylenically unsaturated polyester or polyether-graft copolymer dispersion with an organic polyisocyanate, for instance, an organic polyisocyanate containing a blend of toluene diisocyanate and polymethylene polyphenyl isocyanate such that the polyisocyanate blend contains a small amount of trifunctionality. Improved physical properties in the foam derived therefrom are thus obtained.

The foam is catalyzed using as co-catalysts a tertiary amine catalyst such as triethylene diamine and at least one metal-containing basic catalyst selected from the group consisting of alkali metal hydroxides, preferably sodium, potassium and lithium, and alkaline earth metal hydroxides, preferably calcium, strontium and barium and basic salts of both alkali metal and alkaline earth metal hydroxides formed by reaction with weak inorganic acids such as boric acid, phosphoric acid and carbonic acid. Especially useful are the alkali metal and alkaline earth metal carbonate and bicarbonate salts. Metal organic catalysts selected from the group consisting of the alkaline earth and alkali metal carboxylates, phenates and alkoxides are also useful in combination with a tertiary amine catalyst.

DESCRIPTION OF THE DRAWINGS

The invention will be more fully described by reference to the accompanying drawings, FIGS. 1 and 2.

FIG. 1 is a graph showing the relationship of the height of polyurethane foam produced after the foam has been cured at various time intervals at a temperature of 200° F. and subsequent to crushing the foam. Curve A corresponds to a foam prepared following the procedure of Example 1 in which a co-catalyst combination of the invention, i.e., sodium bicarbonate and triethylene diamine, is utilized. Curves B and C are plotted from data obtained in comparative Examples 2 and 3 and illustrate foams prepared utilizing respectively triethylene diamine or sodium bicarbonate as the single catalyst component.

FIG. 2 is a graph illustrating the polyurethane foam height results obtained indicating completeness of cure. In a foam prepared as described in Example 4 using a co-catalyst combination of sodium bicarbonate and triethylene diamine the results obtained are plotted as curve D. Foam height results obtained with a similar composition described in comparative Example 5 utilizing only triethylene diamine as the single cure catalyst are plotted as curve E, the data being obtained from Comparative Example 5.

As can be seen from FIG. 1, use of a high level of sodium bicarbonate in combination with triethylene diamine results in a polyurethane foam mixture having faster curing speed than can be obtained with comparable amounts by weight of either triethylene diamine or sodium bicarbonate used alone as catalyst. Where smaller amounts of sodium bicarbonate are used in combination with triethylene diamine in the co-catalyst combination of the invention, it is seen in FIG. 2 that a delayed action effect occurs followed by an increased cure speed subsequent to the polyurethane composition attaining a critical temperature as shown by the crossover point on curves D and E.

DETAILED DESCRIPTION OF THE INVENTION

The catalyst systems of the invention provide resilient, flexible foam compositions which can be partially cured rapidly to a desirable green strength allowing removal from the mold in a shorter period than is possible with prior art catalyst systems. Not only is the faster curing speed of the catalyst systems of the invention shown in practice by the fact that the foams can be removed from the mold in a shorter period, but lower cure temperatures can be used to promote the reaction when the catalyst systems of the invention are utilized. At certain proportions, the co-catalyst systems of the invention promote the improved moldability referred to above by causing a delayed catalysis during the initial flow and expansion of the polymer mixture in the mold and subsequently promote the cure at a faster rate during part of the cure cycle than conventional catalyst systems. This faster cure rate is achieved unexpectedly without foam shrinkage. Thus the usual crushing procedure to break the cell walls is unnecessary.

It is apparent that the uniqueness of the co-catalyst system of the invention lies not only in the apparently faster cure rate which provides improved green strength of the foam produced but in the delayed action effect of the co-catalyst system. As the result of this delayed action effect, the catalyst system of the invention allows improved flow of the foam-forming reaction mixture in the mold prior to the ultimate cure of the foam. This catalyst action permits the preparation of a foam without the usual flaws obtained using other high resilient foam catalyst systems, for instance, a tertiary amine catalyst as the sole catalyst. If a tertiary amine catalyst is used as the sole catalyst and it is required to improve the flow in the mold of the foam-forming reaction mixture, the proportion of the amine catalyst can be decreased, thus making a slower reacting system. However, in this case the foam produced at the end of a reasonable time would not be sufficiently cured to remove from the mold. Furthermore, because of the lower catalyst concentration a foam of higher density would be obtained which is undesirable. In addition, both comparatively poor compression set and fatigue properties would be obtained as the result of the use of the lower catalyst concentration where a tertiary amine catalyst is used as the only catalyst. Increasing the proportion of tertiary amine catalyst in order to improve the green strength of ease of removing the foam from the mold results in several other problems, for instance, the cure speed can become unduly fast resulting in difficulty closing the lid of the mold subsequent to the filling operation. Underfilled molds, physical imperfections of the molded part and inability of the foam-forming material to fill out the mold and tendency to trap air and show shear lines, etc., can also result where higher levels of tertiary amine catalysts are utilized in an attempt to obtain improved green strength.

With the co-catalyst system of the invention, the delayed action effect is such that catalyzation of the polymerization reaction is at first slow in taking place while the foam-forming material flows and expands to fill the mold and, subsequently the polymerization cure rate becomes faster than could be obtained using a practical amount of a tertiary amine catalyst such that satisfactory flow of the foam-forming material takes place. Laboratory experiments with free rise foams have confirmed that when using equal (equivalent) amounts of catalyst, a sodium bicarbonate catalyzed foam is much slower rising than a foam catalyzed with an equal (equivalent) amount of tertiary amine catalyst. It was thus unexpected to find that use of the co-catalyst combination of the invention provides a polyurethane foam exhibiting higher green strength.

The improved green strength is believed the result of the ultimate formation of a trimerized isocyanate structure. Trimerization of a portion of the isocyanate is believed to preferentially occur to produce a stronger polyurethane foam where the inorganic salt is present. The trimerization reaction can be considered to be a type of "in situ" crosslinking reaction so that the polyurethane foams produced by the process of the invention are characterized by a greater number of crosslinks per unit length of the polymer chain as compared to prior art tertiary amine cured polyurethane foams.

The use of co-catalyst systems of the invention in the method herein disclosed to produce a high resilience polyurethane foam provides a novel means, heretofore unknown in the art, for controlling the strength of the cell outlines or struts. These struts or ribs of the foam produced are of such strength so as to permit the production of molded high resilient foams which develop the required physical properties without post cure and without shrinkage subsequent to preparation. Such foams can be produced by the method of the invention having cell walls, or "windows", which rupture at the time of maximum gas evolution during the foaming reaction so as to produce open cell foams. Heretofore such results could be achieved only through a difficult trial and error balancing of the proportions of the ingredients of the foam formulation, particularly the surfactant and catalyst proportions.

DESCRIPTION OF THE PREFERRED EMBODIMENTS

Foamed high resilience, cold-cure foams are obtained generally by reacting a polyol in a single-stage process with an organic polyisocyanate and water in the presence of catalysts, surface active agents or other auxiliary agents. In the process, it is believed that a substantially simultaneous interaction occurs between the isocyanate, the water and the polyol to give the foam product. In this method, surface active agents are used primarily to regulate the size of the cells of the foam and stabilize the foam during the initial formation stage. Surface active agents also promote intimate contact of the ingredients of the foam and stabilize the foam during the initial stages of formation.

Generally the organic polyisocyanate and polyol reactants are used in amounts such that the isocyanate index is of a normal value, for example in the range of about 100 to about 110. However, isocyanate index values outside this range can be used.

While considerable effort has been expended in the closed mold, cold-cure, high resilience molded foam art to develop methods of obtaining a balance between the competing reactions i.e., (1) the isocyanate and water reaction in which carbon dioxide gas is evolved and (2) molecular weight increase or polymer growth reaction, the method of the invention for producing a flexible high resilience open cell foam having improved green strength and improved flow characteristics during expansion in the closed mold has not heretofore been disclosed. High resilience foams made with prior art cold-cure catalyst systems generally involve use of the method of mechanical crushing of the foam in order to break the cell walls and thus avoid shrinkage of the foam. This is because it has heretofore been difficult to achieve a properly balanced catalyst-surfactant ratio in the foamable formulation which was heretofore needed to obtain these improved results. It is thus a specific object of this invention to provide the art with cocatalyst systems whereby these competing reactions can be easily controlled so as to produce flexible resilient molded foams having cell walls which tend to rupture at a time coinciding with maximum gas evolution so that upon cooling of the gas in the cells, the cell walls do not contract and cause shrinkage of the foam. The mechanical crushing of the foam is thus obviated.

In order to achieve these results it is desirable that the cell struts or outlines of the individual cells are of sufficient strength so that foam collapse does not occur. However, the cell "windows" located between these cell struts must be of such strength for foam formation to occur and yet not so strong that rupture cannot take place at the time of maximum gas evolution. Strong closed cells in a high resilience foam are not desirable. Even if such cells were strong enough so that they would resist the external pressure exerted upon them as the gas inside each cell cools, a foam with strong closed cells would have a character referred to in the art as "pneumatic". Such foam would resist compression in the same way that a rubber balloon resists compression and this characteristic is undesirable in comparison with the desirable compression characteristics of foams made of natural rubber latex which are predominantly open cell foams. These and other objects are achieved by the use of the catalyst systems disclosed herein.

THE HYDROXYL-CONTAINING COMPOUNDS

The polyurethane foams of the invention are prepared using hydroxyl-containing graft copolymer dispersions in saturated or unsaturated polyols containing primary hydroxyl groups in a single-stage process. The process of the invention, however, is applicable to the cure of isocyanates with other hydroxyl-containing compounds irrespective of the presence of a graft copolymer dispersion or primary or secondary hydroxyl group-containing polyols.

The preferred hydroxyl-containing, graft copolymer dispersions can be prepared by the in situ polymerization of vinyl monomers in a polyol having from about 0.10 to 0.70 mole of unsaturation per mole of polyol. Such graft copolymer dispersions can be obtained by the simultaneous addition of a vinyl monomer and a free radical catalyst to an unsaturated polyol at an elevated temperature. The unsaturated polyols employed in the preparation of the graft copolymer dispersions are prepared by the reaction of a conventional polyol with an organic compound having both ethylenic unsaturation and a hydroxyl, carboxyl or epoxy group, or alternatively the unsaturated polyols can be prepared by employing an organic compound having both ethylenic unsaturation and hydroxyl, carboxyl, or an epoxy group as a reactant in the preparation of the polyol. Representative organic compounds include unsaturated polycarboxylic acids and anhydrides such as maleic acid and anhydride and unsaturated polyhydric alcohols such as 2-butene-1,4-diol, trimethylolpropane allyl ether and unsaturated epoxides such as butadiene monooxide. Where a polycarboxylic acid or anhydride is used to incorporate unsaturation into the polyols, the carboxyl groups must be replaced with hydroxyl groups prior to use in the preparation of the graft copolymer dispersion by reacting the unsaturated polyol with an alkylene oxide such as ethylene or propylene oxide.

The ethylenically unsaturated monomer or mixture of ethylenically unsaturated monomers used to prepare the graft copolymer dispersion include butadiene, isoprene, 1,4-pentadiene, styrene, $\alpha$-methylstyrene, acrylic and substituted acrylic monomers such as acrylonitrile, acrylic acid and methacrylic acid, vinyl esters and vinyl ethers such as vinyl acetate and vinylmethyl ether and the like. The amount of ethylenically unsaturated monomer used is generally 1% to 30% based upon the weight of the unsaturated polyol.

The hydroxyl-containing compounds can be any conventional polyol having at least two hydroxyl groups on each molecule which can include polyhydroxyl-containing polyesters, polyesteramides, polyalkylene polyether polyols, polyhydroxyl-containing phosphorus compounds and alkylene oxide adducts of polyhydric polythioethers, polyacetals, aliphatic polyols and thiols, amines including aromatic and aliphatic amines as well as mixtures thereof.

Any suitable polyhydroxyl-containing polyester can be used such as are obtained from polycarboxylic acids and polyhydric alcohols. Any suitable polycarboxylic acid can be used to prepare said polyesters such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha$-$\beta$-diethylsuccinic acid, isophthalic acid, terephthalic acid, hemimellitic acid, and 1,4-cyclohexane-dicarboxylic acid. Any suitable polydhyric alcohol can be used to prepare said polyesters including both aliphatic and aromatic alcohols such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glycoside, pentaerythritol, and sorbitol. Also included within the term "polyhydric alcohol" are compounds derived from phenol such as 2,2-bis(4,-hydroxyphenol) propane, commonly known as Bisphenol A.

The hydroxyl-containing polyester can also be a polyesteramide such as is obtained by including some amine or substituting an amino alcohol for the polyol reactant in the preparation of the above polyesters.

Thus, polyester amides can be obtained by condensing an amino alcohol such as ethanolamine with the polycarboxylic acids set forth above or they can be made using the same components that make up the hydroxyl-containing polyester with only a portion of the components being a diamine such as ethylene diamine.

Any suitable polyalkylene polyether polyol can be used such as the polymerization product of an alkylene oxide or of an alkylene oxide with a polyhydric alcohol having from 2 to about 6 hydroxyl groups. Any suitable polyhydric alcohol can be used such as those disclosed above for use in the preparation of the hydroxyl-containing polyesters. Any suitable alkylene oxide can be used to prepare said polyol such as ethylene oxide, propylene oxide, butylene oxide, amylene oxide, and heteric or block copolymers of these oxides. The polyalkylene polyether polyols also can be prepared from other starting materials such as tetra hydrofuran and alkylene oxide-tetrahydrofuran copolymers. Epihalohydrins such as epichlorohydrin as well as aralkylene oxides such as styrene oxide are useful. The polyalkylene polyether polyols can have either primary or secondary hydroxyl groups and, preferably, are polyethers prepared from alkylene oxides having from two to about six carbon atoms. The polyalkylene polyether polyols can be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis-(4,-hydroxyphenol)propane and blends thereof having equivalent weights of from 250 to 5000.

Useful polyalkylene-polyether polyols are the hydroxyl-terminated copolymer polyols disclosed in U.S. Pat. No. 3,823,201, incorporated herein by reference, which are graft copolymer dispersions prepared by the in situ polymerization in the presence of a free radical catalyst of a vinyl monomer in a polyol containing an essential amount of unsaturation. Methods for the use of said polyols in the preparation of polyurethane foams are also described. These dispersions are low viscosity liquids and are advantageously employed to improve the load bearing properties of the high resilience, flexible, cold-cure polyurethane foams of the invention.

Polyhydroxyl-containing phosphorus compounds which can be used include those compounds disclosed in U.S. Pat. No. 3,639,542. Preferred polyhydroxyl-containing phosphorus compounds are prepared from alkylene oxides and acids of phosphorus having a $P_2O_5$ weight equivalency of from about 72% to about 95%.

Suitable polyhydric polythioesters which can be condensed with alkylene oxides include the condensation product of thiodiglycol or the reaction product of a dihydric alcohol such as is disclosed above for the preparation of the hydroxyl-containing polyesters with any other suitable thioether glycol.

Polyhydroxyl-containing polyacetals can be used. These can be prepared by condensing aldehydes with alkylene oxides and also include the reaction product of formaldehyde or other suitable aldehyde with a dihydric alcohol as well as an alkylene oxide such as those disclosed above.

Suitable aliphatic polyols have been described above. Suitable aliphatic thiols which can be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkylene thiols such as 3-hexyne-1,6-dithiol.

Suitable amines which can be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene and aliphatic amines such as methyl amine, triisopropanolamine, ethylene diamine, 1,3-propylene diamine, 1,4-butylene diamine, and 1,3-butylene diamine.

THE CO-CATALYSTS

The catalyst systems for the production of the flexible, resilient polyurethane foam disclosed herein utilize a metal-containing basic catalyst in mixtures with an organic amine catalyst. Examples of basic metal-containing catalysts suitable for use in the process of the present invention include alkali and/or alkaline earth metal, hydroxides, carbonates, carboxylates and bicarbonates. Other examples of metal containing catalysts include salts of the aforesaid metals obtained by the reaction of said alkali or alkaline earth metal hydroxides with acids having an acid strength less than that of hydrochloric acid, for instance, alkali or alkaline earth metal carboxylates, alkoxides (methoxides, ethoxides, propoxides, butoxides) and phenoxides. Said phenoxides can have alkyl substitution such as methyl, ethyl, tertiary butyl, dodecyl and halogen substituents such as chloro and bromo or nitro groups. The preferred metal-containing basic catalysts are the basic salts of sodium and potassium carbonate and bicarbonate.

Suitable amine catalysts can be any tertiary amine as illustrated by thriethylene diamine, N-methyl morpholine, N-ethyl morpholine, diethyl ethanolamine, 1-methyl-4-dimethylamine ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. The proportions of amine catalyst used in the catalyst blends of the invention generally can be about 0.05% to about 5.0%, preferably about 0.25% to about 2.5% and most preferably about 0.1% to about 1.5%, all by weight based upon the weight of the hydroxyl-containing polymer.

The proportions of the metal-containing basic catalyst employed in the catalyst blends of this invention can be about 0.01% to about 1%, preferably about 0.01% to about 0.5% and most preferably about 0.01% to about 0.05% all by weight based upon the weight of the hydroxyl-containing polymer. The proportion of metal-containing catalyst utilized also depends to some extent upon its basicity.

THE ORGANIC POLYISOCYANATES

The organic polyisocyanates which can be employed for the preparation of high resilient, cold-cure polyurethane foams are more fully described in the prior art. These include aromatic, aliphatic and cycloaliphatic polyisocyanates and combinations thereof.

Representative of these types are the diisocyanates such as m-phenylene diisocyanate, tolylene-2,4-diisocyanate, tolylene-2,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene 2,4,6-triisocyanate and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and crude polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine.

FOAM PREPARATION

Preparation of the flexible, high resilience closed molded foams of the invention generally involves the preparation of a two part foamable mixture where as component A, an organic isocyanate, is mixed with component B, water, a polyol and catalyst just prior to deposition of the mixture into the mold. Water is generally used as a blowing agent in the proportion of about 1% to about 10%, preferably about 2% to about 8% and most preferably about 3% to about 5%, all by weight, based upon the hydroxyl-containing material. As previously stated, the use of water promotes the production of carbon dioxide as well as polymer formation by reaction with the organic polyisocyanate. Under certain conditions the use of a fluorocarbon is also desirable as a blowing agent either alone or in combination with water to produce the flexible, resilient, cold-cure foams of the invention. Where such fluorocarbons are used, there is less tendency for shrinkage of the foams presumably because of the solvating and thus weakening effect of the fluorocarbon on the cell walls. Where a fluorocarbon is utilized in combination with water in the preparation of the foams of the invention, amounts of about 1 to about 10% by weight are used based upon the hydroxyl-containing material. Preferably about 2% to about 8% and most preferably about 3% to about 5%, all by weight, or fluorocarbon is used.

Other adjuvants which can be utilized in the usual amounts in the preparation of the flexible, high resilience molded foams of the invention are nonionic surface active agents, silicone oils, foam stabilizing agents, for example, ethyl cellulose, low molecular weight polyhydroxy compounds, such as trimethylolpropane, pigments, coloring matter, plasticizers, for example, dialkyl phthalates such as dioctyl phthalate, fireproofing agents, for example, tri($\beta$-chloroethyl) phosphate, antimony compounds, and fillers such as magnesium carbonate, wood cellulose, talc, calcium silicate, mica, hydrated calcium silicate and calcium carbonate.

The following examples illustrate the various aspects of the invention but are not intended to limit it. Where not otherwise specified throughout this specification and claims, temperatures are given in degrees centigrade and pafrts, percentages and proportions are by weight.

EXAMPLE 1

This example illustrates the preparation of a flexible, highly resilient, cold-cure, closed mold polyurethane foam utilizing a co-catalyst mixture of the invention. The foamable mixture was prepared utilizing a commercial mixing and dispersing machine in which the polyol, water and co-catalyst mixture is separately combined and just prior to deposition of the foam mixture into the mold, an 80/20 mixture of 2,4-, 2,6-toluene diisocyanate is mixed therewith. The ingredients and amounts used to prepare the foams are as follows: polyol A a trimethylol propane-based polyoxypropylene polyol capped with polyoxyethylene groups and having an equivalent weight of 2200, 60 parts by weight, polyol B, a graft copolymer dispersion in a polyol having a hydroxyl number of 26 and a vinyl polymer content of 20 percent by weight prepared by the in situ polymerization of a mixture of styrene and acrylonitrile in a polyol wherein said polyol is prepared by the sequential addition of a mixture of propylene oxide and allyl glycidyl ether and ethylene oxide to glycerol as initiator. 40 parts by weight, water, 2.8 parts by weight, triethylene diamine, 0.15 parts by weight, sodium bicarbonate, 0.15 parts by weight, and an 80/20 by weight mixture of toluene diisocyanate and polymethylene polyphenyl isocyanate, the toluene diisocyanate being an 80/20 by weight mixture respectively of 2,4-, 2,6-toluene diisocyanate, 34.8 parts by weight.

Successive applications of a weighed amount of the above mixture were made into a closed mold followed by curing at 200° F. for specified times as indicated in Table I, followed by crushing of the foam by running the foam through closely set rollers. Measurement of final foam height after crushing in the tests that follow merely provides a means of determining the completeness of cure at various time intervals as the cure temperature is held constant at 200° F. As stated above, use of the catalyst system of the invention obviates the need for the usual crushing of the foam to break the cell walls in order to produce a high resilience foam. The test results are illustrated in Table I below and are graphically shown in FIG. 1, curve A.

Table I

| Foam Thickness as a Measure of Completeness of Cure-All Foams Crushed Before Measurement | | |
|---|---|---|
| Foamable Mixture of Example 1 (Wt. in Grams) | Cure Time at 200° F. (Min.) | Foam Thickness (Inches) |
| 1740 | 1 | 5.53 |
| 1740 | 2 | 5.55 |
| 1740 | 4 | 5.60 |
| 1730 | 6 | 5.56 |
| 1745 | 8 | 5.60 |
| 1745 | 10 | 5.60 |
| 1755 | 12 | 5.60 |
| 1745 | 14 | 5.60 |

EXAMPLE 2

Comparative Example Forming No Part of This Invention

To provide a comparison with the foam prepared in Example 1 above, Example 1 was repeated except that sodium bicarbonate in the amount of 0.3 part by weight was used to replace the mixture of triethylene diamine and sodium bicarbonate used in Example 1. Completeness of cure was measured in the same way as in Example 1 and the data obtained are shown in Table II below and are graphically shown in FIG. 1, curve C.

Table II

Foam Thickness as a Measure of Completeness of Cure-All Foams Crushed Before Measurement

| Foamable Mixture Of Example 2 (Wt. in Grams) | Cure Time at 200° F. (Min.) | Foam Thickness (Inches) |
|---|---|---|
| 1745 | 1 | 5.06 |
| 1745 | 2 | 5.25 |
| 1745 | 4 | 5.26 |
| 1750 | 6 | 5.41 |
| 1745 | 8 | 5.39 |
| 1745 | 10 | 5.41 |
| 1745 | 12 | 5.49 |
| 1745 | 14 | 5.60 |

EXAMPLE 3

Comparative Example Forming No Part of This Invention

In order to provide a further comparison with the foams prepared in Example 1, a foam mixture was prepared as in Example 1 except that triethylene diamine was utilized in the amount of 0.3 parts by weight to replace the co-catalyst combination of triethylene diamine and sodium bicarbonate.

The completeness of cure at various times at a temperature of 200° F. was evaluated by determining the thickness of the foam after cure and after crushing as in the previous Examples. The results of determinations of foam thickness are shown in Table III below and plotted in FIG. 1 of the drawing as curve B.

Table III

Foam Thickness as a Measure of Completeness of Cure-All Foams Crushed Before Measurement

| Foamable Mixture Of Example 3 (Wt. in Grams) | Cure Time at 200° F. (Min.) | Foam Thickness (Inches) |
|---|---|---|
| 1725 | 1 | 5.41 |
| 1735 | 2 | 5.51 |
| 1730 | 4 | 5.55 |
| 1730 | 6 | 5.58 |
| 1730 | 8 | 5.58 |
| 1725 | 10 | 5.58 |
| 1725 | 12 | 5.59 |
| 1730 | 14 | 5.59 |

Comparison of the results obtained in Examples 1 through 3 indicate that with foamable mixtures containing high levels of sodium bicarbonate used in combination with triethylene diamine a faster cure rate is obtained than in Examples 2 and 3 where each of the catalysts is substituted on an equal weight basis for the co-catalyst mixture. It thus appears that there is a synergistic relationship in that one would normally expect to obtain a completeness of cure which would be intermediate between the completeness of cure obtained for each of the catalysts when used alone. At this high level of sodium bicarbonate and triethylene diamine, the effects of the sodium bicarbonate in delaying the action of the catalyst initially, followed by a subsequent acceleration of the action of the catalyst is not seen. This effect is demonstrated in Example 4 below.

EXAMPLE 4

A foamable mixture was prepared by mixing the following parts by weight: polyol A, 60, polyol B, 40, water 2.8, sodium bicarbonate, 0.04, triethylene diamine, 0.16, dimethylethanolamine 0.30, a non-hydrolyzable organosilicone block copolymer surfactant sold as L-5303 by the Union Carbide Corporation, 1.5 and the diisocyanate mixture used in Example 1 in the amount of 35.2 parts by weight. The diisocyanate is combined with the other components just prior to dispensing the foamable mixture into the mold.

The completeness of cure was determined as in the above examples by weighing out approximately the same amount of foamable mixture and curing at various times, as indicated below, at a temperature of 200° F. followed by crushing the foam produced by passing the foam through closely set rollers. The foam thickness is an indication of the completeness of cure. The results are shown in Table IV and are plotted in FIG. 2, curve D.

Table IV

Foam Thickness as a Measure of Completeness of Cure-All Foams Crushed Before Measurement

| Foam Mixture of Example 4 (Wt. in Grams) | Cure Time at 200° F. (Min.) | Foam Thickness (Inches) |
|---|---|---|
| 1500 | 1 | 2.43 |
| 1510 | 2 | 3.81 |
| 1500 | 4 | 4.51 |
| 1505 | 6 | 5.05 |
| 1500 | 8 | 5.27 |
| 1505 | 10 | 5.26 |

EXAMPLE 5

Comparative Example Forming No Part of This Invention

Example 4 is repeated except that 0.16 parts by weight of triethylene diamine is used to substitute for the co-catalyst combination of sodium bicarbonate and triethylene diamine used in Example 4. The completeness of cure was measured as in Example 4 and results are shown in the following Table V. In FIG. 2, curve E, these results are plotted.

Table V

Foam Thickness as a Measure of Completeness of Cure-All Foams Crushed Before Measurement

| Foam Mixture of Example 5 (Wt. in Grams) | Cure Time at 200° F. (Min.) | Foam Thickness (Inches) |
|---|---|---|
| 1505 | 1 | 3.13 |
| 1500 | 2 | 3.77 |
| 1500 | 4 | 4.64 |
| 1500 | 6 | 5.10 |
| 1490 | 8 | 5.26 |

It is apparent from these results that utilizing a low level of sodium bicarbonate in combination with triethylene diamine results in a delayed curing action at low cure times. Since all curing took place at 200° F., the results indicate that the use of the co-catalyst combination of the invention in this system makes the foamable mixture less sensitive to cure at low temperatures while accelerating the cure over otherwise similar compositions containing triethylene diamine as the single curing catalyst. Such properties are advantageous in that there is less tendency in such a foamable mixture containing the co-catalyst mixture of the invention to react prior to completion of flow necessary to fill the closed mold. Thus, greater uniformity and freedom from voids in the molded object results by the use of a foamable mixture containing the co-catalyst combination of the invention without sacrifice of speed of cure once the temperature of the foaming mixture increases to a critical point as indicated at the crossover point of the curves in FIG. 2.

While this invention has been described with reference to certain specific embodiments, it will be recognized by those skilled in the art that many variations are possible without departing from the scope and spirit of the invention.

The embodiments of the invention in which an exclusive property or privilege is claimed are defined as follows:

1. A process for the manufacture of high resilience, flexible, closed-mold, cold-cure, non-shrinking, foamed polyurethanes comprising reacting in the presence of a co-catalyst therefor a foamable mixture consisting of a co-catalyst, an organic polyisocyanate, water, and a polyol selected from the group consisting of (a) a polymer dispersion containing a hydroxyl-terminated, polyether-graft copolymer prepared by the in-situ polymerization of an ethylenically unsaturated monomer in a polyol and mixtures of (a) with (b) a polyoxyalkylene polyether polyol, wherein the proportion of said co-catalyst is about 0.05 percent to about 5.0 percent by weight of at least one tertiary amine and about 0.01 percent to about 1 percent by weight of at least one metal-containing basic catalyst, said proportion being based upon the weight of said polyol and wherein said basic catalyst is selected from the group consisting of at least one of an alkali metal hydroxide, an alkaline earth metal hydroxide, and a basic metal salt thereof derived from the reaction of said hydroxides with a weak inorganic acid or an organic acid.

2. The process of claim 1 wherein said metal-containing basic catalyst is selected from the group consisting of sodium bicarbonate and sodium carbonate.

3. The product of the process of claim 2.

4. The process of claim 2 wherein said polyol is a mixture of a graft copolymer dispersion in a first polyol in admixture with a polyoxyalkylene polyether polyol as a second polyol, said ethylenically unsaturated monomer in said graft copolymer is a mixture of styrene and acrylonitrile and said isocyanate is a mixture of polymethylene polyphenyl isocyanate and toluene diisocyanate.

5. The product of the process of claim 4.

6. The process of claim 4 wherein said second polyether polyol is a trimethylolpropane-based polyoxypropylene polyol capped with polyoxyethylene groups and said first polyol is the sequential addition product of propylene oxide, allyl glycidyl ether and ethylene oxide to glycerol as initiator.

7. The product of the process of claim 6.

8. A flexible, highly resilient, cold-cure, closed-mold, non-shrinking polyurethane foam prepared by the process of reacting a foamable mixture of two components A and B wherein component A consists of an organic polyisocyanate and component B consists essentially of a co-catalyst, water, and a polyol selected from the group consisting of mixtures of (a) a polyoxyalkylene polyether polyol and (b) a polymer dispersion containing a hydroxyl-terminated, polyether-graft copolymer prepared by the in-situ polymerization of an ethylenically unsaturated monomer in a polyol and (b) alone, wherein the porportion of said co-catalyst is about 0.05 percent to about 5.0 percent by weight of at least one tertiary amine and about 0.01 percent to about 1 percent by weight of at least one metal-containing basic catalyst, said proportion being based upon the weight of said polyol and wherein said basic catalyst is selected from the group consisting of at least one of an alkali metal hydroxide, an alkaline earth metal hydroxide, and a basic metal salt thereof derived from the reaction of said hydroxides with a weak inorganic acid or an organic acid.

9. The composition of claim 8, wherein said isocyanate is a mixture of polymethylene polyphenyl isocyanate and toluene diisocyanate.

10. A foamable mixture component which in combination with an organic polyisocyanate forms a foamable mixture useful in the production of flexible, highly resilient, cold-cure, closed-mold, non-shrinking polyurethane foam said component consisting of a co-catalyst, water, a polyol selected from the group consisting of mixtures of (a) a polyoxyalkylene polyether polyol and (b) a polymer dispersion containing a hydroxy-terminated, polyether-graft copolymer prepared by the in-situ polymerization of an ethylenically unsaturated monomer in a polyol and (b) alone, wherein the proportion of said co-catalyst is about 0.05 percent to about 5.0 percent by weight of at least one tertiary amine and about 0.01 percent to about 1 percent by weight of at least one metal-containing basic catalyst said proportion being based upon the weight of said polyol, and wherein said basic catalyst is selected from the group consisting of at least one of an alkali metal hydroxide, an alkaline earth metal hydroxide, and a basic metal salt thereof derived from the reaction of said hydroxides with a weak inorganic acid or organic acid.

11. The composition of claim 10 wherein said metal-containing basic catalyst is selected from the group consisting of sodium bicarbonate and sodium carbonate.

12. The composition of claim 1 wherein said metal-containing basic catalyst is derived from the reaction of at least one alkali metal hydroxide or an alkaline earth metal hydroxide and an organic acid wherein said basic catalyst is selected from the group consisting of alkali metal or alkaline earth metal carboxylates alkoxides and phenates.

13. The composition of claim 11 wherein said polyol is a mixture of a polyoxyalkylene polyether polyol and a polymer dispersion containing a hydroxyl-terminated, polyether-graft copolymer prepared by the in-situ polymerization of an ethylenically unsaturated monomer in a polyol.

14. The composition of claim 13 wherein said polyether polyol is a trimethylolpropane-based polyoxypropylene polyol capped with polyoxyethylene groups.

15. The composition of claim 14 wherein said ethylenically unsaturated monomer is a mixture of styrene and acrylonitrile.

* * * * *